United States Patent Office 2,897,191
Patented July 28, 1959

2,897,191

METALLISABLE TRISAZO DYESTUFFS

Werner Bossard, Riehen, near Basel, and Rudolf Dürig, Basel, Switzerland, assignors to J. R. Geigy A.-G., Basel, Switzerland No Drawing. Application November 10, 1958
Serial No. 772,676

Claims priority, application Switzerland December 6, 1957

8 Claims. (Cl. 260—159)

The invention concerns metallisable trisazo dyestuffs which produce pure, copper-containing cellulose dyeings which are fast to wet and light. It also concerns processes for the production of these trisazo dyestuffs, their use for the obtention of fast cellulose dyeings as well as, as industrial product, the material fast dyed with the aid of these dyestuffs.

It has been found that valuable, metallisable trisazo dyestuffs are obtained if an amino monoazo dyestuff of the general Formula I

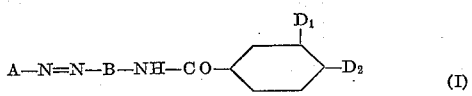

in which A represents the radical of an o-hydroxy or o-carboxy diazonium compound of the benzene and naphthalene series, B represents the radical of a 1-hydroxy-naphthalene-3-sulphonic acid coupled in the 2-position or the radical of a 1-phenyl-5-pyrazolone coupled in the 4-position, which radical contains the benzoyl amide radical in the 6-position of the naphthalene ring or in 4'-position of the 1-phenyl group, and wherein one D is a primary amino group and the other D is a low molecular alkyl group, is diazotised and coupled with a monoazo dyestuff of the general formula

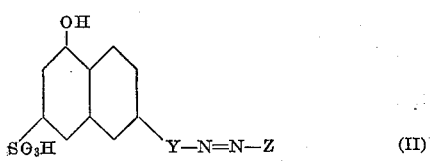

wherein Y represents a coupled enolisable radical bound to the naphthalene radical by means of a nitrogen atom and which is of the acylacetamide or 5-pyrazolone series and contains the azo group at the α-carbon atom of the acylacetyl group or in the 4-position of the 5-pyrazolone radical, and Z represents the radical of an o-hydroxy or o-carboxy diazonium compound of the benzene or naphthalene series.

Advantageously, the aromatic radical A of Fomula I is a benzene ring. Compounds which contain an aliphatic sulphonyl or sulphamide group in the form of fused rings, for example an o-oxymethylene sulphone group or a 1.2.4-thiadiazine-1.1-dioxy ring are also regarded as belonging to the benzene series. In addition to the metallisable group in o-position to the azo linkage, A contains advantageously water solubilising or water solubility promoting substitutents, in particular sulphonic acid groups, or also carboxyl groups, sulphonic acid amide groups including sulphamide groups derived from low organic amines and alkanolamines, or low molecular alkyl sulphonyl groups. In addition the other substituents usual in azo dyestuffs can be present, for example, halogen, low alkyl, alkoxy, acylamino or nitro groups. The radical B is derived from 6-amino-1-hydroxynaphthalene-3-sulphonic acid. In the particularly valuable dyestuffs according to the present invention however, B represents the radical of a 1-(4'-aminophenyl)-5-pyrazolone coupled in the 4-position, in particular the radical of 1-(4'-aminophenyl)-3-methyl-5-pyrazolone. Advantageously the primary amino group of the benzoyl radical is in the p-position to the carbonyl group and, in addition to the ethyl, isopropyl, butyl group, the methyl group is chiefly the low molecular alkyl group D.

The monoazo dyestuff of the general Formula I is obtained for example by coupling in an alkaline medium o-hydroxy or o-carboxy diazonium compounds of the benzene or naphthalene series with 6-(3'.4'- or 4'.3'-aminoalkyl- or nitroalkyl-benzoylamino)-1-hydroxynaphthalene-3-sulphonic acids or with 1-[4'-(3".4"- or 4".3"-aminoalkyl- or nitroalkyl-benzoylamino)-phenyl1-5-pyrazolones and reducing the nitro group to the amino group if necessary, for example with ammonium or alkali sulphides or hydrogen sulphides. It is often more advantageous to acylate the amino monoazo dyestuff, obtained by alkaline coupling from 1 mol of the diazonium compounds mentioned and 1 mol of 6-amino-1-hydroxynaphthalene-3-sulphonic acid or 1-(4'-aminophenyl)-5-pyrazolones, with 3.4- or 4.3-nitroalkylbenzoyl halides and then to reduce the compound obtained with ammonium or alkali sulphides.

The monoazo dyestuffs of the general Formula I are diazotised advantageously by the indirect method. Further details can be seen from the examples.

In the coupling component of the general Formula II, when Y represents an acylacetamino group, it is advantageously the acetoacetylamino group; end products in which Y is a 5-pyrazolone radical are more fast to light. These are preferred therefore. In these and all other 5-pyrazolone rings possibly present, the 3-position can be occupied by the usual substituents such as carboxyl, carboxylic acid ester, carboxylic acid amide, phenyl or alkyl groups; however, the methyl group in this position is advantageous. For a high degree of fastness to light of the dyestuffs according to the present invention, it is favourable if the radical Z belongs to the benzene series. Apart from the metallisable group in the o-position to the azo linkage, the radical symbolised by Z can contain the other substituents usual in diazo components, for example those listed above under A.

The azo components of the general Formula II are obtained, for example, by coupling o-hydroxy or o-carboxy diazonium compounds of the benzene and naphthalene series (the benzene series again encompassing compounds having heterocyclically bound sulphonyl and sulphamide groups), with 6-acylacetylamino- or 6-(pyrazole-5'-one-1'-yl)-1-hydroxynaphthalene-3-sulphonic acids. The coupling is performed in a neutral to weakly acid medium, for example in the acetic acid aqueous solution of the alkali metal salts of these acids in the presence of alkali metal salts of lower fatty acids.

The diazotised monoazo dyestuffs of the Formula I are coupled with the azo components of the Formula II in an alkaline medium. The trisazo dyestuffs according to the present invention are isolated by the usual methods by salting out with sodium or potassium chloride.

The new trisazo dyestuffs correspond to the general Formula III

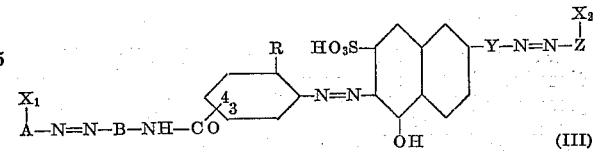

wherein A and Z each represents radicals selected from the group consisting of the benzene and naphthalene series, B represents a radical selected from the group consisting of

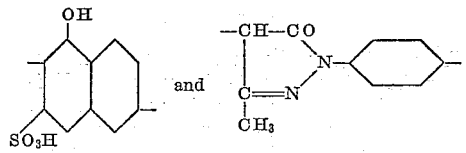

Y represents a radical selected from the group consisting of

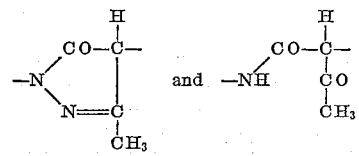

$X_1$ and $X_2$ each represents a metallisable group in o-position to the azo group selected from the group consisting of —OH and —COOH, and R represents a lower alkyl radical.

In a preferred group of dyestuffs according to the present invention, the azo linkage is in the p-position to the carbonyl group of the benzoyl radical and "R" is the methyl group in the m-position. Very valuable dyestuffs are those in which B represents a 1-p-phenylene-3-methyl-5-pyrazolone radical coupled in the 4-position. Particularly valuable because of their good fastness to light are dyestuffs in which Y is the 3-methyl-pyrazolone-5-one-1-yl radical. It has already been stressed above that A and Z are preferably of the benzene series.

In the form of the water soluble alkali metal salts, the trisazo dyestuffs according to the present invention are red to brown powders. Depending on the composition, aqueous solutions thereof are orange to blueish red and in concentrated sulphuric acid solution the colour is red to red-brown. The new dyestuffs dye cellulose fibres direct from baths containing sodium sulphate in orange to blueish-red shades. The wet fastness properties and the fastness to light are improved by coppering on the fibre. The dyestuffs according to the present invention can also be converted in substance completely or partially into their complex copper compounds. Partially coppered dyestuffs, which also can be metallised on the fibre, can be produced on using metal-containing diazo and coupling components. The usual agents giving off copper can be used for coppering such as copper sulphate, copper acetate or complex copper salts of aliphatic hydroxy acids which are stable in alkaline solution such as, for example, those of tartaric acid. Agents of this latter type can also be used for coppering during dyeing.

The following examples illustrate the invention without limiting it in any way. Parts are given as parts by weight and temperatures are in degrees centigrade. The relationship of parts by weight to parts by volume is as that of grammes to cubic centimetres.

*Example 1* obtained is salted out with 50 parts of sodium chloride, filtered off and washed with diluted sodium chloride solution. The monoazo dyestuff is suspended in 700 parts of water at 10° and 4 parts of concentrated caustic soda lye, 7 parts of sodium nitrite are then added and then 35 parts of concentrated hydrochloric acid are added whereupon the whole is stirred for several hours at 10–15°.

In the meantime, 18.9 parts of 2-amino-1-hydroxybenzene-4-sulphonic acid are diazotised with 6.9 parts of sodium nitrite and the diazonium compound is reacted at 25–30° with a solution of 32.0 parts of 6-(3'-methyl - pyrazole - 5' - one - 1' - yl) - 1 - hydroxynaphtha-

*Table 1*

| No. | Amino compound A | Amino compound Z | after-coppered dyeing on cotton |
|---|---|---|---|
| 1 | 2-aminobenzene-1-carboxylic acid. | 6 - nitro - 2 - amino - 1 - hydroxybenzene - 4 - sulphonic acid. | blueish red. |
| 2 | ____do____ | 6 - chloro - 2 - amino - 1 - hydroxybenzene - 4 - sulphonic acid. | Do. |
| 3 | ____do____ | 6 - nitro - 1 - amino - 2 - hydroxynaphthalene - 4 - sulphonic acid. | blue-red. |
| 4 | ____do____ | 2 - amino - 1 - hydroxybenzene-4-ethyl sulphone. | blueish red. |
| 5 | 2 - amino - 1 - hydroxybenzene - 4 - methyl sulphone. | 6 - nitro - 1 - amino - 2 - hydroxynaphthalene - 4 - sulphonic acid. | ruby red. |
| 6 | ____do____ | 2 - aminobenzene - 1 - carboxylic acid. | blueish red. |
| 7 | 2-amino - 1 - hydroxybenzene - 4 - ethyl sulphone. | 2 - amino - 1 - hydroxybenzene-4-sulphonic acid. | ruby red. |
| 8 | ____do____ | 6 - chloro - 2 - amino - 1 - hydroxybenzene - 4 - sulphonic acid. | Do. |
| 9 | 2-aminobenzene-1-carboxylic acid - 5 - sulphonic acid. | 2 - amino - 1 - hydroxybenzene-4-methyl sulphone. | blueish red. |
| 10 | ____do____ | 2 - aminobenzene - 1 - carboxylic acid. | red. |
| 11 | ____do____ | 2 - amino - 1 - hydroxybenzene. | blueish red. |
| 12 | 2-aminobenzene-1-carboxylic acid - 4 - sulphonic acid. | 2 - amino - 1 - hydroxybenzene-4-sulphonic acid dimethylamide. | Do. |
| 13 | ____do____ | 2 - amino - 1 - hydroxybenzene-4-methyl sulphone. | Do. |
| 14 | 2-aminobenzene-1-carboxylic acid - 5 - sulphonic acid amide. | 6 - nitro - 2 - amino - 1 - hydroxybenzene - 4 - sulphonic acid. | Do. |
| 15 | ____do____ | 2 - amino - 1 - hydroxybenzene-4-sulphonic acid. | Do. |
| 16 | ____do____ | 6 - fluoro - 2 - amino - 1 - hydroxybenzene - 4 - sulphonic acid. | Do. |
| 17 | ____do____ | 5 - nitro - 2 - amino - 1 - hydroxybenzene. | Do. |
| 18 | 4-chloro-2 - aminobenzene - 1 - carboxylic acid. | 6 - chloro - 2 - amino - 1 - hydroxybenzene - 4 - sulphonic acid. | Do. |
| 19 | 2-amino - 1 - hydroxybenzene-4-sulphonic acid. | 6 - benzoylamino - 2 - amino-1 - hydroxybenzene - 4 - sulphonic acid. | ruby red. |
| 20 | ____do____ | 2 - amino - 1 - hydroxybenzene-4-ethyl sulphone. | Do. |
| 21 | ____do____ | 2 - aminobenzene - 1 - carboxylic acid. | blueish red. |
| 22 | 2-aminobenzene-1-carboxylic acid. | 6 - chloro - 1 - amino - 2 - hydroxynaphthalene - 4 - sulphonic acid. | ruby red. |

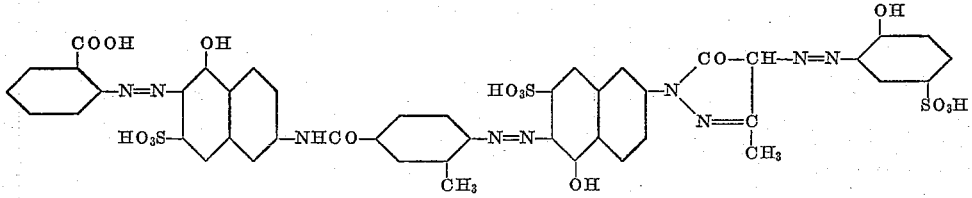

13.7 parts of 2-aminobenzene-1-carboxylic acid are diazotised in the usual way with sodium nitrite in the presence of hydrochloric acid and the diazonium compound is coupled at 10° with the sodium salt of 37.2 parts of 6 - (3' - methyl - 4' - aminobenzoyl)-amino-1-hydroxynaphthalene-3-sulphonic acid in 500 parts of water and 16 parts of sodium bicarbonate. The monoazo dyestuff lene-3-sulphonic acid and 20 parts of concentrated caustic soda lye in 300 parts of water, which solution has been acidified immediately before the coupling with 15 parts of concentrated acetic acid. The yellow monoazo dyestuff so obtained is dissolved in water by the addition of 6 parts of sodium carbonate, 20 parts of sodium bicarbonate are added and the solution is cooled to 20°.

Then the diazo monoazo dyestuff obtained above is added dropwise. On the next day, the red trisazo dyestuff is precipitated with sodium chloride and washed with diluted sodium chloride solution. After drying, it is a dark red-brown powder which dissolves in water with a pure red and in concentrated sulphuric acid with a Bordeaux red colour. It dyes natural and regenerated cellulose fibres, on treating with copper salts in the presence of acetic acid, in pure blueish red shades which have good fastness to light, washing, water, alkali and acid.

Analogous dyestuffs having similar fastness properties are obtained if, instead of 2-aminobenzene-1-carboxylic acid, equimolar amounts of the amino compound A given in Table 1 are used according to the method described above, and if instead of 2-amino-1-hydroxybenzene-4-sulphonic acid, equimolar amounts of the amino compound Z given in Table 1 are used.

Dyestuffs having similar shades and fastness properties are obtained if instead of 6-(3'-methyl-4'-aminobenzoylamino)-1-hydroxynaphthalene-3-sulphonic acid, the corresponding number of parts of 6-(3'-ethyl- or 3'-isopropyl-4-aminobenzoylamino)-1-hydroxynaphthalene-3-sulphonic acid are used.

EXAMPLE 2 been added. The coupling is soon complete. The monoazo dyestuff obtained is dissolved with 10 parts of concentrated caustic soda in water, 7 parts of sodium nitrite are added and, at 10°, 50 parts of concentrated hydrochloric acid are added all at once. After some hours, the diazo monoazo dyestuff is filtered off and washed with cold water.

56.8 parts of the yellow monoazo dyestuff obtained by acetic acid coupling of the diazonium compound obtained from 6-nitro-2-amino-1-hydroxybenzene-4-sulphonic acid with 6-acetoacetylamino-1-hydroxynaphthalene-3-sulphonic acid are dissolved with 10 parts of sodium carbonate in 800 parts of water and 20 parts of sodium bicarbonate are added. The diazo monoazo compound obtained is then added at 10–15° while stirring well.

On the next day, the whole is heated to 80°, 250 parts of sodium chloride and 20 parts of concentrated ammonia solution are added and the precipitated trisazo dyestuff is filtered off. It is washed with hot diluted sodium chloride solution, dried and ground. The dark brown-red powder obtained dissolves in water with a red and in concentrated sulphuric acid with a red-brown colour and it dyes cotton fibres, when after-coppered, in a pure red shade. The dyeings have excellent fastness to washing, water, perspiration and light.

If, in the process used in the example, equimolar

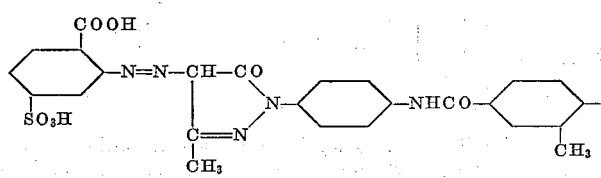
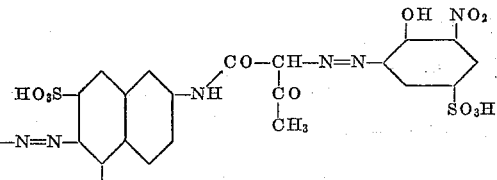

A solution of 32.2 parts of 1-[4'-(3''-methyl-4''-aminobenzoylamino)-phenyl]-3-methyl-5-pyrazolone and 19 parts of concentrated caustic soda lye in 500 parts of water is poured at 10–12° into the diazonium compound from 21.7 parts of 2-aminobenzene-1-carboxylic acid-5-sulphonic acid to which 25 parts of sodium acetate have been added.

amounts of the aminoazo compounds A coupled with B named in the following Table 2 are diazotised and coupled with a yellow monoazo dyestuff from the diazotised amino compound Z and 6-acetoacetylamino-1-hydroxynaphthalene-3-sulphonic acid, then similar valuable dyestuffs are obtained.

*Table 2*

| No. | Amino compound A | Middle component corresponding to $D_1$, B-NH-CO-⟨⟩-$D_2$ | Amino compound Z | After coppered dyeing on cotton |
|---|---|---|---|---|
| 1 | 2-aminobenzene-1-carboxylic acid-5-sulphonic acid. | 1-[4'-(3''-methyl-4'''-aminobenzoyl-amino)-phenyl]-3-methyl-5-pyrazolone. | 6-benzoylamino-2-amino-1-hydroxybenzene-4-sulphonic acid. | red. |
| 2 | ___do___ | ___do___ | 6-chloro-2-amino-1-hydroxybenzene-4-sulphonic acid. | Do. |
| 3 | 2-aminobenzene-1-carboxylic acid-4-sulphonic acid. | ___do___ | ___do___ | Do. |
| 4 | 6-nitro-1-amino-2-hydroxynaphthalene-4-sulphonic acid. | ___do___ | 6-nitro-2-amino-1-hydroxybenzene-4-sulphonic acid. | blueish red. |
| 5 | 2-amino-1-hydroxybenzene-4-sulphonic acid. | ___do___ | 2-amino-1-hydroxybenzene-4-methyl sulphone. | red. |
| 6 | ___do___ | ___do___ | 6-bromo-2-amino-1-hydroxybenzene-4-sulphonic acid. | Do. |
| 7 | 2-amino-1-hydroxybenzene-5-sulphonic acid. | ___do___ | 6-chloro-2-amino-1-hydroxybenzene-4-sulphonic acid. | Do. |
| 8 | 5-nitro-2-amino-1-hydroxybenzene-4-sulphonic acid. | ___do___ | 2-amino-1-hydroxybenzene-4-sulphonic acid. | Do. |
| 9 | 6-nitro-2-amino-1-hydroxybenzene-4-sulphonic acid. | ___do___ | 6-chloro-2-amino-1-hydroxybenzene-4-sulphonic acid. | Do. |
| 10 | ___do___ | ___do___ | 6-nitro-2-amino-1-hydroxybenzene-4-sulphonic acid. | Do. |
| 11 | 6-fluoro-2-amino-1-hydroxybenzene-4-sulphonic acid. | ___do___ | 6-benzoylamino-2-amino-1-hydroxybenzene-4-sulphonic acid. | Do. |
| 12 | 6-chloro-2-amino-1-hydroxybenzene-4-sulphonic acid. | ___do___ | 6-chloro-2-amino-1-hydroxybenzene-4-sulphonic acid. | Do. |
| 13 | 4-chloro-2-amino-1-hydroxybenzene-6-sulphonic acid. | ___do___ | 6-benzoylamino-2-amino-1-hydroxybenzene-4-sulphonic acid. | Do. |

Table 2—Continued

| No. | Amino compound A | Middle component corresponding to B-NH-CO-⟨⟩-D₂ (D₁) | Amino compound Z | After coppered dyeing on cotton |
|---|---|---|---|---|
| 14 | 2-aminobenzene-1-carboxylic acid. | 6-(3'-methyl-4'-aminobenzoylamino)-1-hydroxynaphthalene-3-sulphonic acid. | 2-amino-1-hydroxybenzene-4-sulphonic acid. | blueish red. |
| 15 | 4-chloro-2-aminobenzene-1-carboxylic acid. | ___do___ | ___do___ | Do. |
| 16 | 2-aminobenzene-1-carboxylic acid-5-sulphonic acid amide. | ___do___ | 2-aminobenzene-1-carboxylic acid-5-sulphonic acid amide. | red. |
| 17 | 2-aminobenzene-1-carboxylic acid-5-sulphonic acid. | ___do___ | 2-aminobenzene-1-carboxylic acid. | Do. |
| 18 | ___do___ | ___do___ | 2-amino-1-hydroxybenzene-4-ethyl sulphone. | blueish red. |
| 19 | 2-aminobenzene-1-carboxylic acid-4-sulphonic acid. | ___do___ | ___do___ | Do. |
| 20 | 2-amino-1-hydroxybenzene-4-sulphonic acid amide. | ___do___ | 2-aminobenzene-1-carboxylic acid. | Do. |
| 21 | 2-amino-1-hydroxybenzene-4-methyl sulphone. | ___do___ | 2-amino-1-hydroxybenzene-4-sulphonic acid. | ruby. |
| 22 | 6-chloro-2-amino-1-hydroxybenzene-4-sulphonic acid. | ___do___ | 6-chloro-2-amino-1-hydroxybenzene-4-sulphonic acid. | Bordeaux. |
| 23 | 2-aminonaphthalene-3-carboxylic acid. | ___do___ | 2-amino-1-hydroxybenzene-4-sulphonic acid. | blueish red. |

EXAMPLE 3

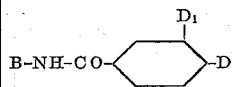

22.3 parts of 6-chloro-2-amino-1-hydroxybenzene-4-sulphonic acid are diazotised in the usual way and added dropwise at 25° to a solution from 32.0 parts of 6-(3'-methyl - pyrazole - 5' - one - 1' - yl) - 1 - hydroxynaphthalene - 3 - sulphonic acid and 20 parts of concentrated caustic soda lye in 300 parts of water, which solution has been made weakly acid with 15 parts of concentrated acetic acid. After some hours, the dyestuff formation is complete. The yellow monoazo dyestuff is precipitated with 10% by volume of sodium chloride, filtered off and washed with 10% sodium chloride solution.

A diazonium compound from 30.8 parts of 6-benzoylamino-2-amino-1-hydroxybenzene-4-sulphonic acid is neutralised by sprinkling in 10 parts of sodium bicarbonate and coupled with 32.2 parts of 1-[4-(3''-methyl-4'' - aminobenzoylamino) - phenyl] - 3 - methyl - 5 - pyrazolone by adding a solution thereof with 19 parts of concentrated caustic soda lye in 600 parts of water dropwise. The precipitated amino monoazo dyestuff is filtered off and washed with diluted salt solution. It is diazotised by pasting in 800 parts of ice water, first adding 7 parts of sodium nitrite and, after some time, adding 35 parts of concentrated hydrochloric acid and then stirring for several hours in the cold.

To couple to form the trisazo dyestuff, the yellow monoazo dyestuff described at the beginning is dissolved in 1000 parts of water and 5 parts of sodium carbonate and 40 parts of sodium bicarbonate are added. The diazo monoazo dyestuff obtained is then slowly poured in. On the next day, the whole is heated to 80°, 10 parts by volume percent of sodium chloride and 20 parts of concentrated ammonia solution are added and the precipitated trisazo dyestuff is filtered off. After drying and milling, it is a dark, brown-red powder which dissolves in water and in concentrated sulphuric acid with a red colour. It dyes cotton and staple fibre in pure red shades which, when after-treated with copper salts, have very good fastness to washing, light, perspiration and alkali.

Dyestuffs having similar properties are given in the following Table 3. They are obtained according to this example when, instead of the 6-benzoylamino-2-amino-1-hydroxybenzene-4-sulphonic acid, an amino compound A is used and when instead of 6-chloro-2-amino-1-hydroxybenzene-4-sulphonic acid, an amino compound Z is used. Equimolar amounts of both are used.

Table 3

| No. | Amino compound A | Amino compound Z | after coppered dyeing on cotton |
|---|---|---|---|
| 1 | 6 - benzoylamino - 2 - amino-1-hydroxybenzene-4-sulphonic acid. | 6-nitro-2-amino-1-hydroxybenzene - 4 - sulphonic acid. | red. |
| 2 | ___do___ | 2-aminobenzene-1-carboxylic acid-5-sulphonic acid. | Do. |
| 3 | ___do___ | 2-amino-1-hydroxybenzene-4-sulphonic acid. | Do. |
| 4 | ___do___ | 6-benzoylamino-2-amino-1-hydroxybenzene-4-sulphonic acid. | Do. |
| 5 | ___do___ | 2-amino-1-hydroxybenzene-5-sulphonic acid. | Do. |
| 6 | 6-chloro-2-amino-1-hydroxybenzene - 4 - sulphonic acid. | 2-amino-1-hydroxybenzene-4-methyl sulphone. | Do. |
| 7 | ___do___ | 2-amino-1-hydroxybenzene-4-sulphonic acid. | Do. |
| 8 | 2-amino-1-hydroxybenzene-4-sulphonic acid. | 2-amino-1-hydroxybenzene - 4 - sulphonic acid amide. | Do. |
| 9 | ___do___ | 2-amino-1-hydroxybenzene - 4 - sulphonic acid methyl ethanol amide. | Do. |
| 10 | ___do___ | 6-chloro-2-amino-1-hydroxybenzene - 4 - sulphonic acid. | Do. |
| 11 | ___do___ | 6-nitro-1-amino-2-hydroxynaphthalene - 4 - sulphonic acid. | Do. |
| 12 | 2 - amino - 1 - hydroxybenzene - 4 - ethyl sulphone. | 2-amino-1-hydroxybenzene-4-sulphonic acid. | Do. |
| 13 | ___do___ | 6-nitro-2-amino-1-hydroxybenzene - 4 - sulphonic acid. | Do. |
| 14 | 2-aminobenzene-1-carboxylic acid. | 2-amino-1-hydroxybenzene-4-sulphonic acid. | yellow-red. |
| 15 | 6 - nitro - 1 - amino - 2 - hydroxynaphthalene-4-sulphonic acid. | ___do___ | blue-red. |
| 16 | 2-aminonaphthalene-3-carboxylic acid. | ___do___ | red. |

Table 3—Continued

| No. | Amino compound A | Amino compound Z | after coppered dyeing on cotton |
|---|---|---|---|
| 17 | 2-aminobenzene-1-carboxylic acid - 5 - sulphonic acid. | 6-nitro-2-amino-1-hydroxybenzene - 4 - sulphonic acid. | Do. |
| 18 | ___do___ | 6-chloro-2-amino-1-hydroxybenzene - 4 - sulphonic acid. | Do. |
| 19 | ___do___ | 6-benzoylamino-2-amino-1-hydroxybenzene - 4 - sulphonic acid. | Do. |
| 20 | ___do___ | 6 - bromo - 2 - amino - 1 - hydroxybenzene-4-sulphonic acid. | Do. |
| 21 | 5 - nitro - 2 - amino - 1 - hydroxybenzene - 4 - methyl sulphone. | 2-amino-1-hydroxybenzene-4-sulphonic acid. | Do. |
| 22 | 6 - nitro - 2 - amino - 1 - hydroxybenzene - 4 - sulphonic acid. | 6-nitro-2-amino-1-hydroxybenzene-4-sulphonic acid. | Do. |
| 23 | 2-aminobenzene-1-carboxylic acid - 5 - sulphonic acid amide. | 2-amino-1-hydroxybenzene-4-sulphonic acid. | Do. |
| 24 | 4-chloro - 2 - amino - 1 - hydroxybenzene. | ___do___ | Do. |
| 25 | 4 - chloro - 2 - aminobenzene-1-carboxylic acid. | ___do___ | Do. |
| 26 | 2-aminobenzene-1-carboxylic acid - 4 - sulphonic acid. | 6-chloro-2-amino-1-hydroxybenzene - 4 - sulphonic acid. | Do. |
| 27 | ___do___ | 6-bromo-1-amino-2-hydroxynaphthalene-4-sulphonic acid. | Do. |
| 28 | 6-chloro-2-amino-1-hydroxybenzene - 4 - sulphonic acid. | 6-nitro-2-amino-1-hydroxybenzene - 4 - sulphonic acid. | Do. |
| 29 | ___do___ | 6-benzoylamino-2-amino-1 - hydroxybenzene - 4 - sulphonic acid. | Do. |
| 30 | 2-amino-1-hydroxybenzene-4-sulphonic acid. | 2-amino - 1 - hydroxybenzene-4-sulphonic acid. | Do. |
| 31 | 6 - nitro - 2 - amino - 1 - hydroxybenzene - 4 - sulphonic acid. | 6-chloro-2-amino-1-hydroxybenzene - 4 - sulphonic acid. | Do. |
| 32 | 2-amino-1-hydroxybenzene-4-sulphonic acid. | 2 - aminonaphthalene - 3 - carboxylic acid. | Do. |
| 33 | 2-aminobenzene-1-carboxylic acid - 4- sulphonic acid. | ___do___ | Do. |

Similar dyestuffs are also obtained if the corresponding number of parts of 1-[4'-(3''-ethyl- or 3''-propyl-4''-aminobenzoylamino)-phenyl]-3-methyl-5-pyrazolone are used instead of the 3''-methyl compound described for the production of the dyestuffs named in the table.

EXAMPLE 4

10 parts of sodium acetate are added to the acid, aqueous solution of a diazonium compound from 23.4 parts of 6-nitro-2-amino-1-hydroxybenzene-4-sulphonic acid. The solution of 32.2 parts of 1-[4'-(3''-amino-4''-methylbenzoylamino) - phenyl - 3 - methyl - 5 - pyrazolone in 600 parts of water and 25 parts of concentrated 30% caustic soda lye is poured in at 10–15°. The amino monoazo dyestuff formed is precipitated with 5 parts by volume percent of sodium chloride, filtered off, washed with a diluted sodium chloride solution and stirred in 800 parts of water. After the addition of 7 parts of sodium nitrite, 36 parts of concentrated hydrochloric acid are added quickly at 10° and the whole is left to react for several hours. The diazo monoazo dyestuff so obtained is poured into a solution of 52 parts of the yellow monoazo dyestuff obtained according to Example 1 from diazotised 2-amino-1-hydroxybenzene-4-sulphonic acid→6-(3'-methyl - pyrazole - 5' - one - 1' - yl) - 1 - hydroxynaphthalene-3-sulphonic acid, 6 parts of sodium carbonate and 20 parts of sodium bicarbonate in 800 parts of water. The red trisazo dyestuff obtained is precipitated with sodium chloride, filtered off, washed with diluted sodium chloride solution and dried. It is a dark brown powder which dissolves in water and in concentrated sulphuric acid with a red-orange colour. Cellulose fibres are aftercoppered in pure red-orange shades which have good fastness to washing, water, acid, alkali and light.

Further valuable dyestuffs are given in Table 4 which are obtained by this process if the compounds named in columns 1 and 2 are coupled to form the amino monoazo dyestuff A→B, this is diazotised and coupled with the yellow monoazo dyestuff which is obtained from the diazo component Z in column 4 by coupling with the coupling component

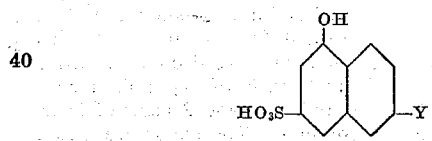

in column 3.

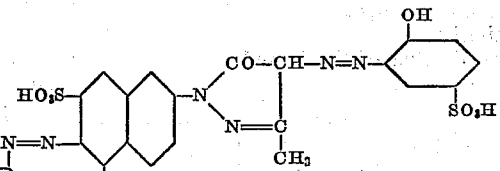

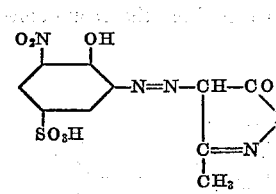

Table 4

| No. | Diazo monoazo dyestuff from— | | coupled monoazo dyestuff from— | | after coppered dyeing on cotton |
|---|---|---|---|---|---|
| | amino compound A | middle component B | coupling component X—Y | amino compound Z | |
| 1 | 2-amino-1-hydroxy-benzene-4-sulphonic acid. | 1- [4'-(4''- methyl -3''-aminobenzoyl-amino)-phenyl]-3-methyl-5-pyrazolone. | 6-(3'- methyl - pyrazole - 5' - one-1'-yl)-1-hydroxy-naphthalene-3-sulphonic acid. | 2-amino-1-hydroxybenzene - 4 - sulphonic acid. | red orange. |
| 2 | ___do___ | ___do___ | ___do___ | 6-chloro-2-amino-1-hydroxybenzene-4-sulphonic acid. | Do. |
| 3 | 2-aminobenzene-1-carboxylic acid-5-sulphonic acid. | ___do___ | ___do___ | ___do___ | orange. |
| 4 | ___do___ | ___do___ | ___do___ | 2-aminobenzene-1-carboxylic acid-5-sulphonic acid amide. | Do. |
| 5 | 6-nitro-1-amino-2-hydroxy-naphthalene 4-sulphonic acid. | ___do___ | ___do___ | ___do___ | red orange. |
| 6 | 6-chloro-2-amino-1-hydroxy-benzene-4-sulphonic acid. | ___do___ | ___do___ | 6-nitro-2-amino - 1 - hydroxy - benzene-4-sulphonic acid. | Do. |
| 7 | ___do___ | ___do___ | 6-acetoacetyl-amino 1-hydroxy-naphthalene - 3 - sulphonic acid. | ___do___ | yellowish red. |

Table 4—Continued

| No. | Diazo monoazo dyestuff from— amino compound A | Diazo monoazo dyestuff from— middle component B | coupled monoazo dyestuff from— coupling component X—Y | coupled monoazo dyestuff from— amino compound Z | after coppered dyeing on cotton |
|---|---|---|---|---|---|
| 8 | 6-nitro-2-amino-1-hydroxybenzene-4-sulphonic acid. | ---do--- | ---do--- | 2-amino-1-hydroxybenzene-4-sulphonic acid. | Do. |
| 9 | 2-aminobenzene-1-carboxylic acid-4-sulphonic acid. | ---do--- | ---do--- | 6-benzoylamino-2-amino-1-hydroxybenzene-4-sulphonic acid. | red orange. |
| 10 | 2-aminobenzene-1-carboxylic acid. | 6-(4'-methyl-3'-aminobenzoylamino)-1-hydroxynaphthalene-3-sulphonic acid. | ---do--- | 2-amino-1-hydroxybenzene-4-sulphonic acid. | red. |
| 11 | 2-amino-1-hydroxybenzene-4-methyl sulphone. | ---do--- | ---do--- | ---do--- | blueish red. |
| 12 | 2-aminonaphthalene-3-carboxylic acid. | ---do--- | ---do--- | ---do--- | |
| 13 | 2-aminobenzene-1-carboxylic acid-5-sulphonic acid. | ---do--- | ---do--- | 6-bromo-2-amino-1-hydroxybenzene-4-sulphonic acid. | Do. |
| 14 | 2-aminobenzene-1-carboxylic acid. | ---do--- | 6-(3'-methyl-pyrazole-5'-one-1'-yl)-1-hydroxynaphthalene-3-sulphonic acid. | 6-chloro-2-amino-1-hydroxybenzene-4-sulphonic acid. | Do. |
| 15 | 2-amino-1-hydroxybenzene-4-isopropyl sulphone. | ---do--- | ---do--- | 2-aminobenzene-1-carboxylic acid-4-sulphonic acid. | Do. |
| 16 | 2-amino-1-hydroxybenzene-4-sulphonic acid. | ---do--- | ---do--- | 6-chloro-1-amino-1-hydroxynaphthalene-4-sulphonic acid. | ruby. |
| 17 | 2-aminobenzene-1-carboxylic acid-5-sulphonic acid. | 6-(4'-ethyl-3'-aminobenzoylamino)-1-hydroxynaphthalene-3-sulphonic acid. | ---do--- | 6-nitro-2-amino-1-hydroxybenzene-4-sulphonic acid. | red. |
| 18 | 6-nitro-2-amino-1-hydroxybenzene-4-sulphonic acid. | 1-[4'-(4''-ethyl-3''-aminobenzoylamino)-phenyl]-3-methyl-5-pyrazolone. | ---do--- | 6-chloro-2-amino-1-hydroxybenzene-4-sulphonic acid. | red orange. |
| 19 | 6-chloro-1-amino-2-hydroxynaphthalene-4-sulphonic acid. | ---do--- | ---do--- | 2-amino-2-hydroxybenzene-4-sulphonic acid. | red. |
| 20 | ---do--- | ---do--- | ---do--- | 6-bromo-1-amino-2-hydroxynapthalene-4-sulphonic acid. | Do. |

EXAMPLE 5

1.0 part of the dyestuff obtained according to Example 1 is dissolved in a dyebath containing 3000 parts of water and 2 parts of sodium carbonate. 100 parts of cotton are entered at 40–50°, the bath is heated within 30 minutes to 90–95°, 30 parts of sodium sulphate are then added and dyeing is performed for 45 minutes at this temperature. The dyed goods are rinsed cold and after treated in a fresh bath with 2 parts of crystallised copper sulphate in 2000 parts of water and 2 parts of 30% acetic acid at 70° for 30 minutes. The goods are rinsed and dried in the usual way. The cotton is dyed in pure bluish red shades which have good fastness to washing, water, perspiration and light.

What we claim is:

1. The trisazo dyestuff of the formula

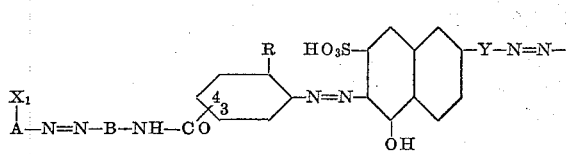

wherein A and Z each represents radicals selected from the group consisting of the benzene and naphthalene series, B represents a radical selected from the group consisting of

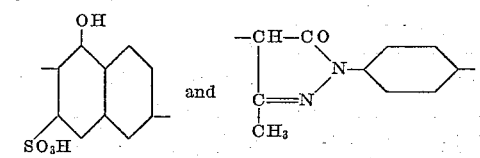

Y represents a radical selected from the group consisting of

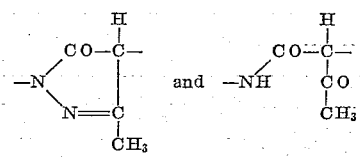

and $X_1$ and $X_2$ each represents a metallisable group in o-position to the azo group selected from the group consisting of —OH and —COOH, and R represents a lower alkyl radical, said trisazo dyestuff containing at most three naphthalene radicals.

2. The trisazo dyestuff of the formula

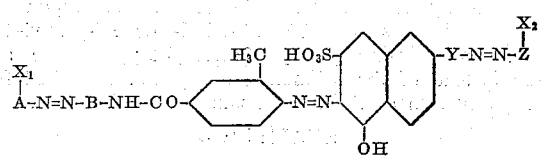

wherein A and Z each represents radicals of the benzene series, B represents a radical selected from the group consisting of

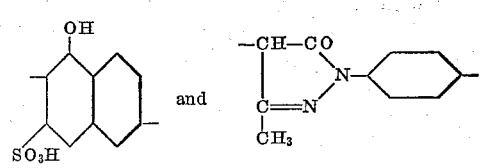

Y represents a radical selected from the group consisting of

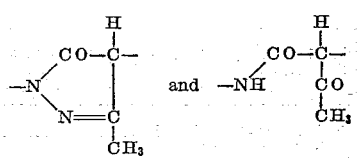

and $X_1$ and $X_2$ each represents a metallisable group in o-position to the azo group selected from the group consisting of —OH and —COOH.

3. The trisazo dyestuff of the formula

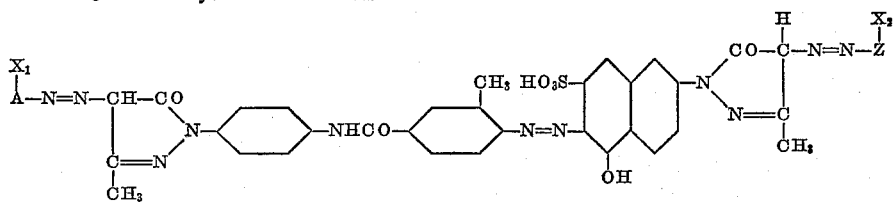

wherein A and Z each represents radicals of the benzene series, and $X_1$ and $X_2$ each represents a metallisable group in o-position to the azo group selected from the group consisting of —OH and —COOH.

4. The trisazo dyestuff of the formula

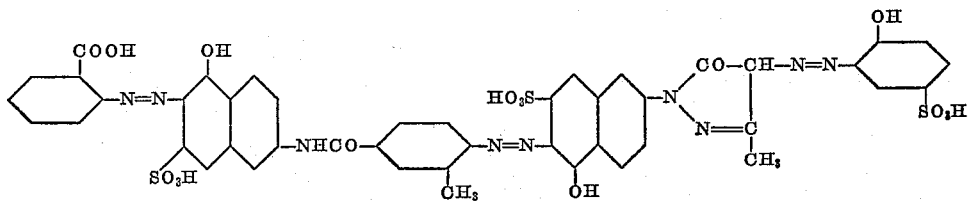

5. The trisazo dyestuff of the formula

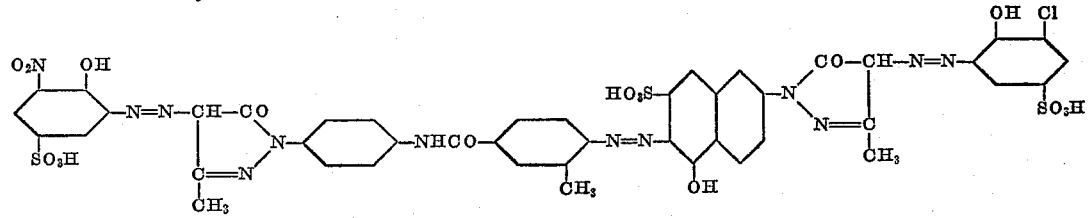

6. The trisazo dyestuff of the formula

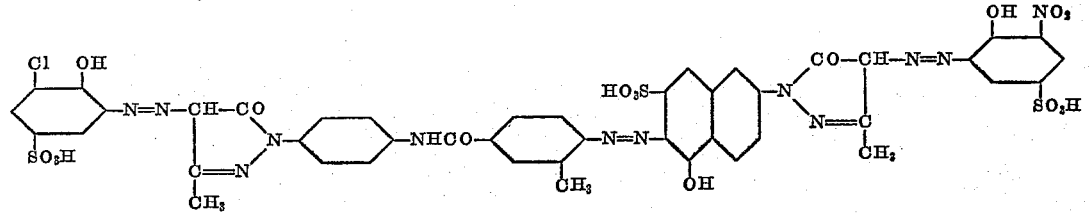

7. The trisazo dyestuff of the formula

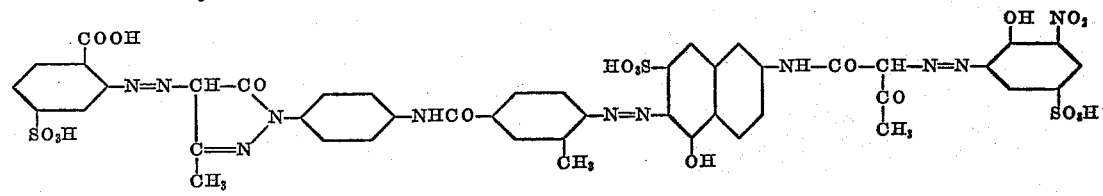

8. The trisazo dyestuff of the formula

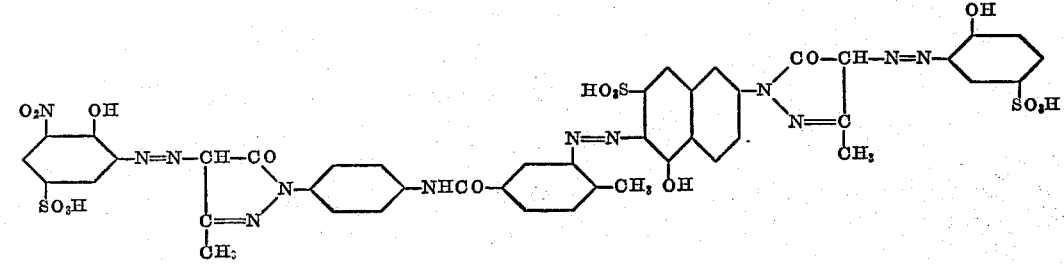

No references cited.